United States Patent [19]

Marquardt

[11] 4,139,855
[45] Feb. 13, 1979

[54] RECORDER WITH DRIVEN PAPER SUPPLY IN DRAWER

[75] Inventor: Bernd F. Marquardt, Egling, Fed. Rep. of Germany

[73] Assignee: Medronik Systemtechnik GmbH, Fed. Rep. of Germany

[21] Appl. No.: 855,761

[22] Filed: Nov. 29, 1977

[30] Foreign Application Priority Data

Dec. 8, 1976 [DE] Fed. Rep. of Germany ....... 2655495

[51] Int. Cl.² ...................... G01D 15/00; G01D 15/28
[52] U.S. Cl. ..................................... 346/145; 346/136
[58] Field of Search .................... 346/33 ME, 68, 136, 346/145

[56] References Cited

U.S. PATENT DOCUMENTS

| | | | |
|---|---|---|---|
| 937,047 | 10/1909 | Brown | 346/68 UX |
| 1,962,311 | 6/1934 | Knobel | 346/136 UX |
| 2,888,310 | 5/1959 | Perry | 346/145 X |
| 2,924,499 | 2/1960 | Young et al. | 346/145 |
| 3,048,848 | 8/1962 | May | 346/68 UX |
| 3,080,561 | 3/1963 | Bowditch et al. | 346/145 UX |
| 3,294,212 | 12/1966 | Gearheart et al. | 346/145 UX |
| 3,545,004 | 12/1970 | Alden | 346/136 UX |
| 3,787,885 | 1/1974 | Johnson | 346/136 |
| 3,946,406 | 3/1976 | Miura et al. | 346/145 |

Primary Examiner—George H. Miller, Jr.
Attorney, Agent, or Firm—William E. Mouzavires

[57] ABSTRACT

A recorder for recording measured data on paper rolls or folded paper, comprising a means adapted to be pulled out for inserting the paper and a paper drive means arranged in said means to be pulled out, and further comprising a stylus or needle arrangement, and an electrical control circuit for stylus displacement. The stylus arrangement and the control circuit are disposed above the means to be pulled out. The recorder preferably comprises a plurality of recording channels and is adapted to be introduced into a 19 inch housing (module 3).

10 Claims, 6 Drawing Figures

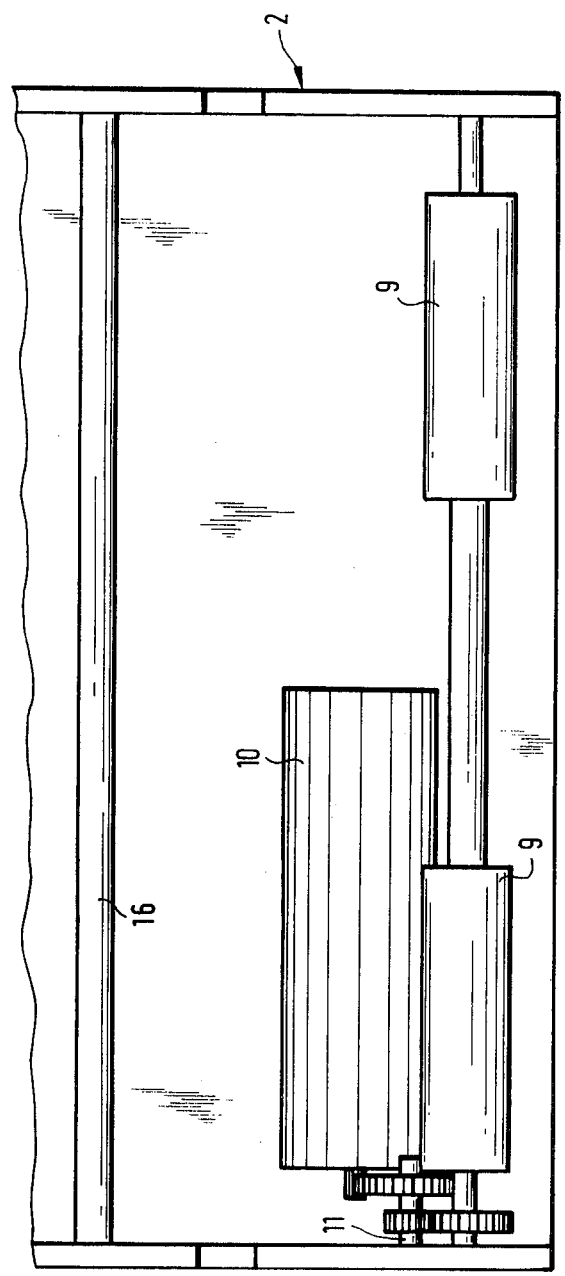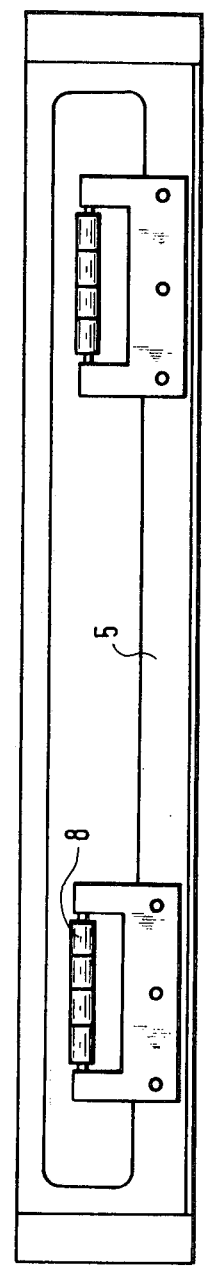
FIG. 2
FIG. 3

RECORDER WITH DRIVEN PAPER SUPPLY IN DRAWER

FIELD OF THE INVENTION

The invention relates to a recorder for recording measured data, in particular medical measured data on paper rolls or folded paper, such as fanfold paper, comprising a means to be pulled out for inserting the paper, a drive means for the paper, a stylus or needle arrangement, and an electrical control circuit to effect stylus displacement.

BACKGROUND OF THE INVENTION

In known recorders the major part of the paper drive means normally is fixed in the recorder housing and enters into engagement with a part, such as a gear, of the drive means disposed in the drawer-type means for inserting paper. A drive means arranged in this manner causes considerable service and maintenance expenditure and is rather subject to wear. Moreover, this arrangement requires a lot of space so that the known recorders cannot be installed in smaller electronic structural units, such as the 19 inch housing (module 3). This applies above all to recorders employing folded paper since this kind of paper, although being easy to file and store, is not very space-saving in operation.

SUMMARY OF THE INVENTION

It is an object of the present invention to design and arrange the mechanical and electrical parts of a recorder of the kind in question, in particular the paper drive means such that a recorder is obtained which is easy to service and not susceptible to trouble.

It is further object of the invention to design a compact recorder of such small dimensions that it can be fitted, for instance, in a 19 inch housing.

It is yet another object of the invention to provide a recorder which can be used for paper rolls as well as continuous folded paper without any expensive and complicated structural modifications.

These and further objects which will become apparent as the specification proceeds are met, in accordance with the invention, in that the paper drive means is arranged in the means to be pulled out for inserting the paper, a means which is actuable from outside being provided for pressing the paper into contact with a drive element, and in that the stylus or needle arrangement and the control circuit are disposed above the means which is adapted to be pulled out. The arrangment in accordance with the invention of the drive means permits simple and quick service of the drive means and requires only little space, particularly if the drive means is disposed in the front portion of the means to be pulled out. In combination with the installation of the stylus arrangement and control circuit above the drawer-type means adapted to be pulled out the invention provides a very compact recorder which can be advantageously fitted, for instance, in a 19"-housing, such as frequently used in practice for electronic structural elements of the most varied kinds having European standard card size.

Advantageous embodiments of the drive means and of the stylus arrangement are presented in the subclaims.

BRIEF DESCRIPTION OF THE DRAWING

The invention will be described further, by way of example, with reference to the accompanying drawings, in which:

FIG. 2 is a top plan view of the paper drive means, FIG. 3 is a rear elevational view of the handle bar.

DETAILED DESCRIPTION OF PREFERRED EMBODIMENTS

Figure 1:
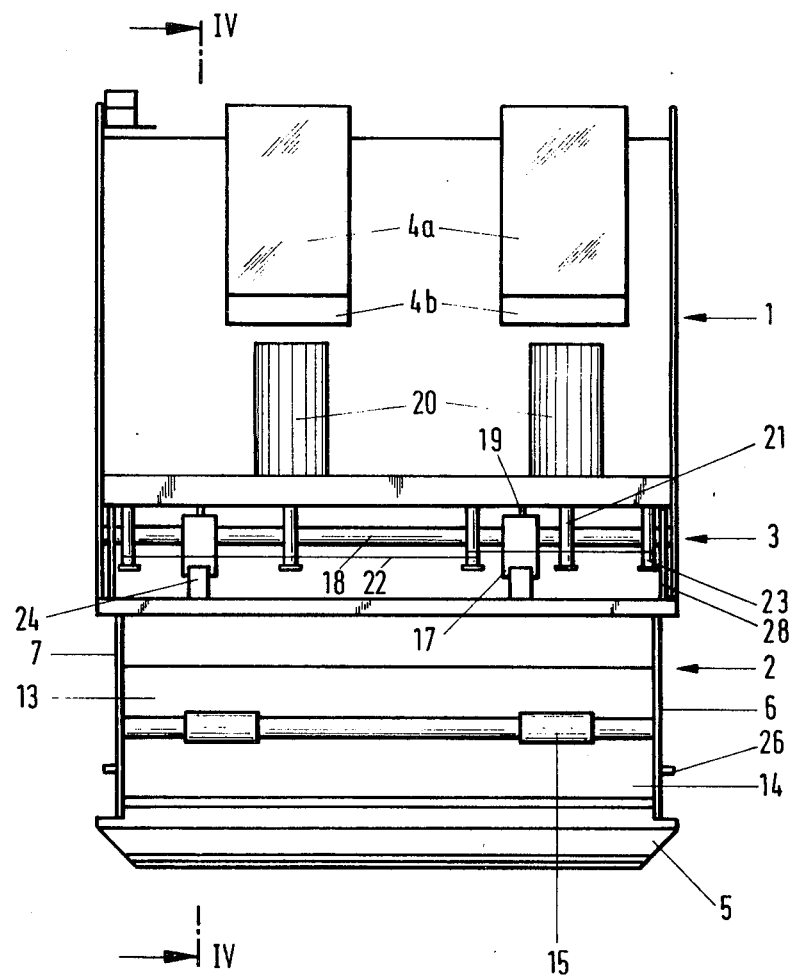
FIG. 1 is a top plan view of a recorder on a diminished scale, comprising two recording channels, the means for inserting paper being shown pulled out.
Figure 4:
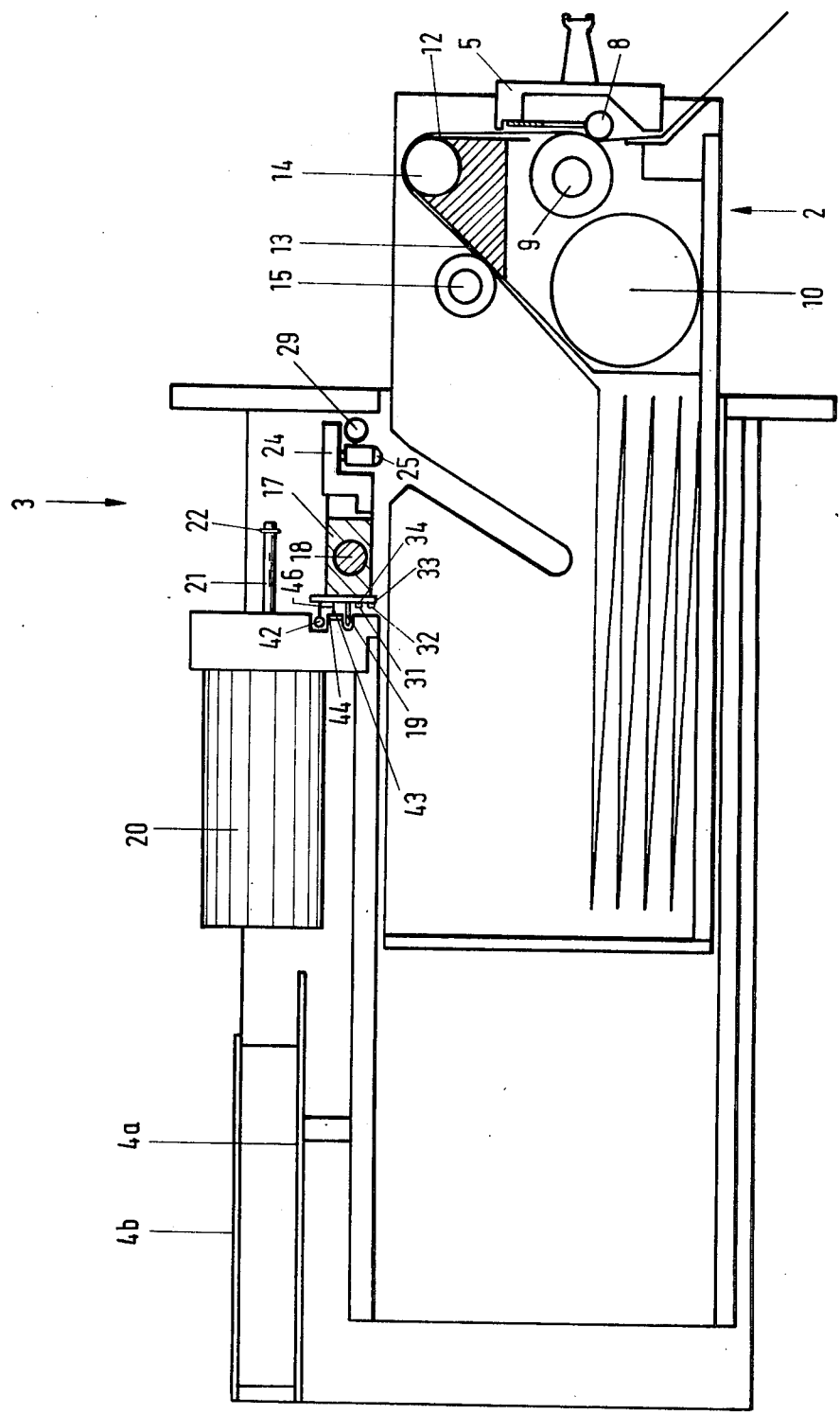
FIG. 4 is a sectional elevation along line IV—IV of FIG. 1, including a supply of folded paper.

FIG. 1 shows a recorder 1 with a means adapted to be pulled out and embodied by a drawer 2 for inserting the paper. The recorder as shown further comprises a stylus arrangement 3 and small plates 4a and 4b on which electric circuit elements are received which serve for displacement and heating of the stylus. As its front the drawer 2 is provided with a vertically adjustable handle bar 5 guided by pins in longitudinal slots formed in the sidewalls 6 and 7 of the drawer. As may be gathered especially from FIGS. 3 and 4, freely rotatable rollers 8 are arranged at the backside of handle bar 5. These rollers 8 are moved into force lock engagement with two drive elements, likewise designed as rollers 9, by displacing handle bar 5 vertically in downward direction (cf. FIG. 4). In this condition the paper which is clamped between rollers 8 and 9 is advanced at a predetermined speed by means of an electric motor 10 and intermediate gearing 11. Electric power supply to motor 10 is provided by a plug connection which becomes engaged when the drawer 2 is pushed in. Upon displacing handle bar 5 upwardly so as to interrupt the engagement between rollers 8 and 9 it is easy to pull the paper out by hand. Advantageously the rollers 9 of the drive means have a free-wheeling axle which permits withdrawal of the paper without any difficulty even when the handle bar 5 is in its lower position.

The drive means 9, 10, 11 is covered by a plate 12 which comprises an inclined portion 13 for the steady, continuous guidance of the paper, particularly if folded paper is used, and a turning or diverting edge 14 which serves as basis for the recording procedure and is preferably made of tetrafluoroethylene. Conveniently, brake rollers 15 are provided which are biased against the inclined portion 13 of plate 12, for instance, by springs (not shown) guided in slots formed in the sidewalls 6 and 7 so that the paper, particularly folded paper may be advanced in taut condition which guarantees accurate recording. Thus the paper is tensioned between brake rollers 15 and drive rollers 9 which are cooperating with rollers 8 and in this manner any slackness in the paper transport is avoided. When using paper rolls which may be disposed, for example, on a freely rotatable shaft 16, the second clamping instance may be realized by heavy running of the paper roll itself.

Figure 5:
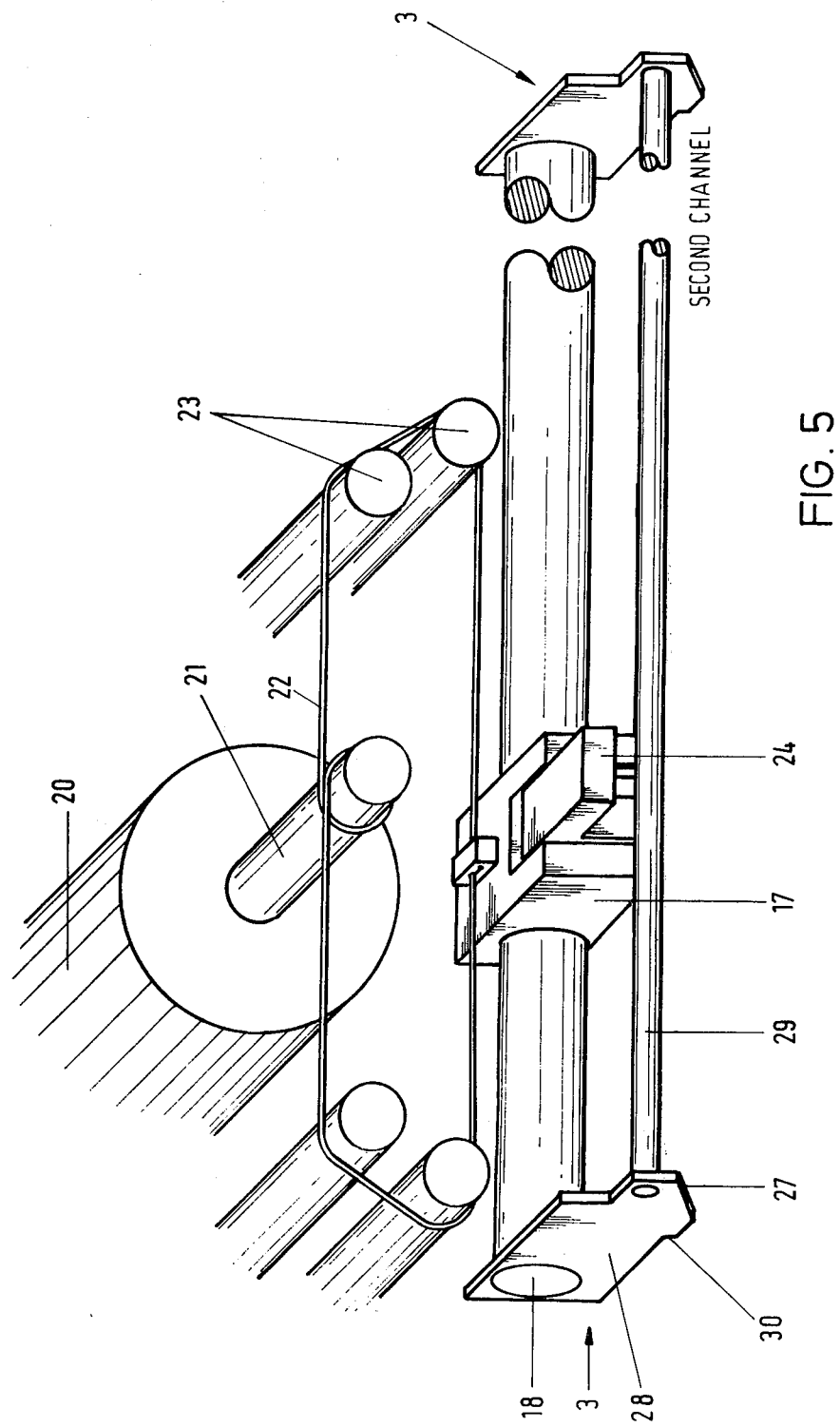
FIG. 5 is a perspective view of the stylus arrangement, on an enlarged scale.

As shown especially in FIG. 5, the stylus arrangement consists of a guide block 17 mounted on a shaft 18 for horizontal displacement across the channel width and guided at the recorder housing by means of a fitting pin 19. Displacement of the guide block is effected by a setting motor 20 acting through a drive shaft 21 and a drive string 22, the ends of which are passed over guide rollers 23 and connected to guide block 17. A vertically pivotable lever element 24 is hingedly connected at the front part of guide block 17 and carries the stylus which is designed as a heater element. A pin 26 each is located at the outside of either sidewall 6, 7 in order to lift the stylus 25 briefly from its support surface, i.e. the paper or the turning edge 14 when drawer 2 is pulled out or pushed in. When drawer 2 is pushed in, each pin 26 enters into engagement with a cam edge 27 formed at a lateral lug 28. The lateral lugs 28 are interconnected by a rod 29 and supported for pivoting movement about shaft 18. When the lateral lugs 28 are swung vertically upwards, taking along rod 29, the rod in turn tilts lever element 24 whereby stylus 25 which is fixed to lever element 24 is raised from its supporting surface. The same happens when drawer 2 is pulled out. Then the pins 26 enter into engagement with a rear cam edge 30 formed at the lateral lugs 28.

As mentioned before, the stylus or needle is designed, for example, as a heater element. In that event the measured data are recorded on heat-sensitive paper. Resistance heating of stylus 25 is obtained by means of two bus bars 31, 32 which are disposed at the recorder housing to touch contact springs 33, 34 located at the rear of guide block 17. The temperature of the stylus is regulated in response to the paper advance speed, for instance by varying a reference voltage. For example, at a paper advance speed of 1 cm/min. a reference voltage of 1 V (and thus a certain temperature) is associated with the stylus. Upon changing over to a paper advance speed of, for example 3 cm/min., the reference voltage is increased to a predetermined value of, for example 1.5 V.

Preferably the stylus is made of platinum-iridium which is characterized by great abrasion resistance and good thermal conductivity. The mass of the stylus should be as small as possible in order to obtain quick and reliable recording on the paper when the measured data appear only briefly, for example, to retain measured values which are not trustworthy, such as those failing to reach one second. A suitable stylus structure for this purpose is one that comprises a ceramic body as carrier and heat insulator and a thick film resistor as stylus having minute dimensions, such as a diameter of 0.3 mm. The temperature of the stylus can be controlled either independently of or in response to the measured data recording procedure. Temperature control in dependence of the actual recording is advisable, above all, if high resolution is desired with rapid procedures, in particular as regards the peak values.

Figure 6:
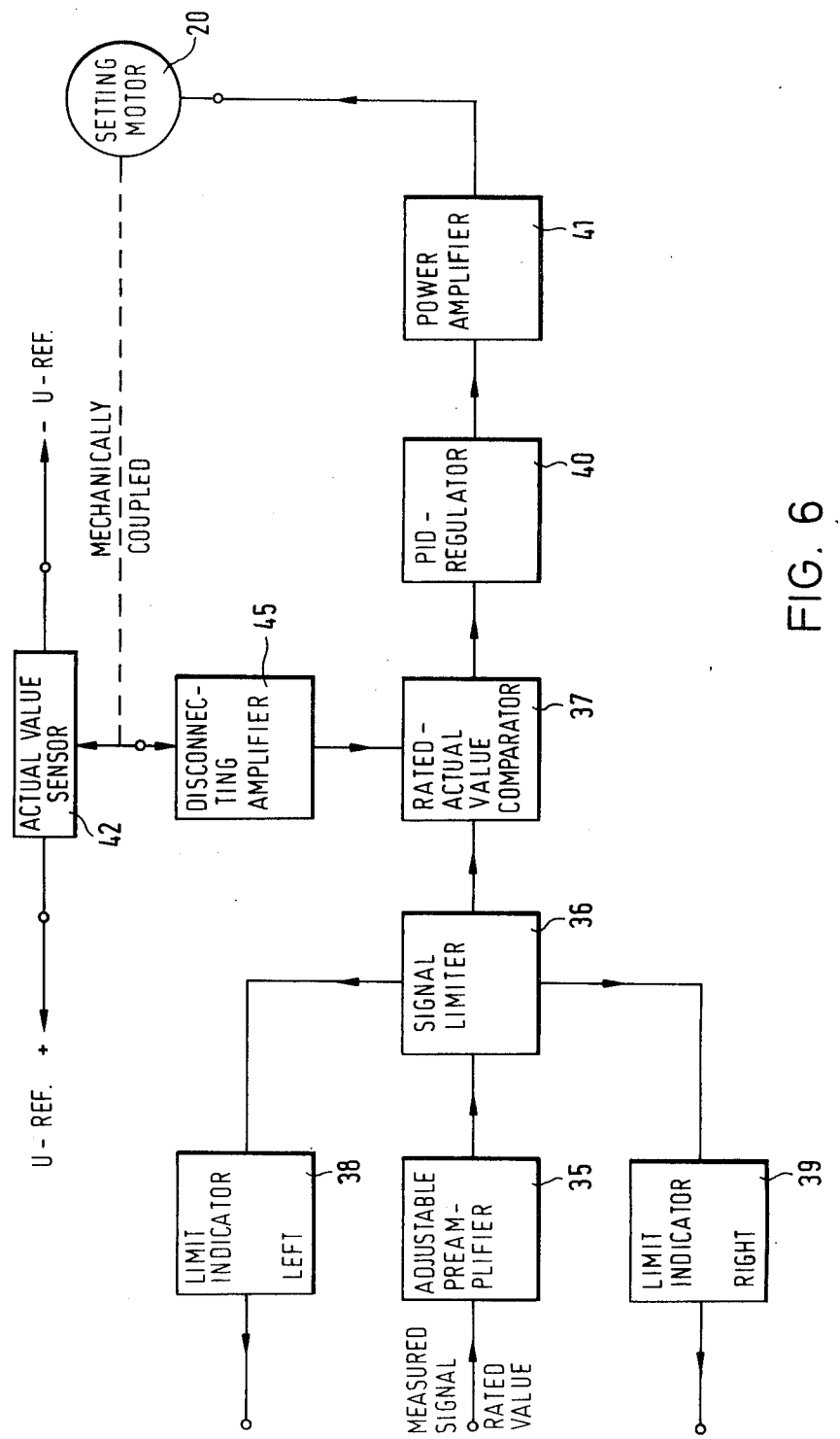
FIG. 6 is a block diagram of the recorder control circuit.

Displacement of stylus 25 along the given channel width is effected by the control circuit shown in the form of a block diagram in FIG. 6. The measured signal (rated value) first is applied to a preamplifier 35. From the preamplifier the signal is passed on through a signal limiter 36, determining the peak value which can be recorded, to a comparator 37 of rated and actual values. Advantageously, limit indicators 38 and 39 are provided for the left and right abutment, respectively. The limit signals may be applied to an additional electronic circuit (not shown). The signal resulting from the comparison of the rated value with the actual value is passed on through a PID regulator 40 and a power amplifier 41 to setting motor 20 which adjusts stylus 25 accordingly. The actual value is derived from an actual value sensor, for example, a bar 42 mounted at the recorder housing and through a contact spring 46 disposed at the backside of guide block 17 and is applied through a contact spring 43 likewise located at the backside of guide block 17 to another bar 44 which is mounted at the housing.

This bar supplies the actual value to the rated-actual value comparator 37 by way of a disconnecting or isolation amplifier 45.

The electric circuit elements described above are arranged on small plates 4a and 4b adapted to be joined to each other or to the housing by a plug connection. Plate 4a, for example, takes up the elements required for control and heating, while the preamplifier 35, signal limiter 36, and limit indicators 38, 39 are disposed on the upper plate 4b. If limit electronics is not desired, the upper plate 4b may simply be left out without requiring any additional structural changes.

A recorder destined for installation in a 19"- housing may comprise up to eight recording channels having a width of approximately 50 mm. If the number of recording channels is smaller, of course, wider channels may be chosen. It is advantageous to select the dimensions of the recorder and of additional electronic structural elements for a 19"housing in accordance with a given mosaic system.

What is claimed is:

1. A recorder for recording measured data, in particular medical measured data paper rolls or folded paper, comprising a means to be pulled out for inserting the paper, a drive means for the paper, a stylus arrangement, and an electrical control circuit for the stylus displacement, wherein said paper drive means is arranged in said means adapted to be pulled out for inserting the paper, a means which is actuable from outside being provided for pressing the paper into contact with a drive element, and wherein said stylus arrangement and said control circuit are disposed above said means to be pulled out.

2. A recorder as claimed in claim 1, wherein the axle of said drive elements is free-wheeling.

3. A recorder as claimed in claim 1, wherein said stylus is designed as a heater element and the temperature of said stylus is controllable.

4. A recorder as claimed in claim 1, wherein said stylus is displaceable across the width of its channel by means of a setting motor controlled by said control circuit and acting through a string guide means, and wherein a guide block of said stylus comprises contact springs which are in contact with an actual value sensor designed as a bar and with another bar, respectively, said bars being mounted at the recorder housing.

5. A recorder as claimed in claim 1, wherein said recorder comprises a plurality of recording channels and is adapted to be inserted in a 19 inch housing (module 3).

6. A recorder as claimed in claim 1, wherein said means to be pulled out is adapted to be brought into engagement with a stylus lifting means upon being pulled out and pushed in.

7. A recorder as claimed in claim 6, wherein said stylus lifting means comprises a cam-lever arrangement.

8. A recorder as claimed in claim 1, wherein said drive means is positioned in the front portion of said means to be pulled out and consists of an electric motor, intermediate gearing, and at least one drive roller adapted to be pressed against the paper with the aid of said contact pressure effecting measn.

9. A recorder as claimed in claim 8, wherein said contact pressure effecting means consists of a vertically displaceable handle bar.

10. A recorder as claimed in claim 9, wherein freely rotatable rollers are provided at the backside of said handle bar and adapted to be brought into engagement with said drive rollers of said drive means, clamping the paper in between.

* * * * *